June 11, 1963 W. M. BISHOP 3,093,333
STOWAGE APPARATUS FOR CABLE INSTRUMENTALITY HOUSINGS
Filed July 1, 1960 6 Sheets-Sheet 1
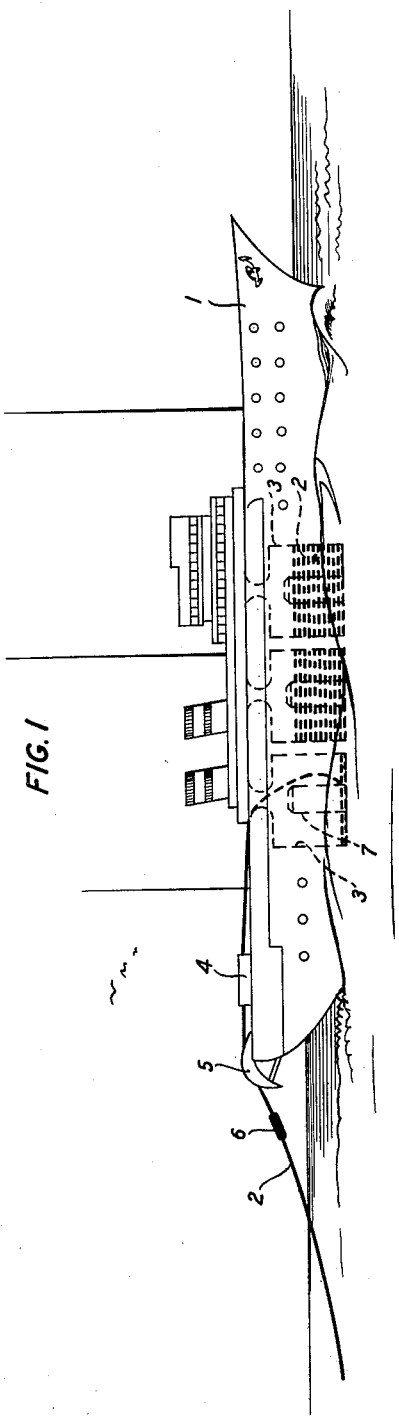
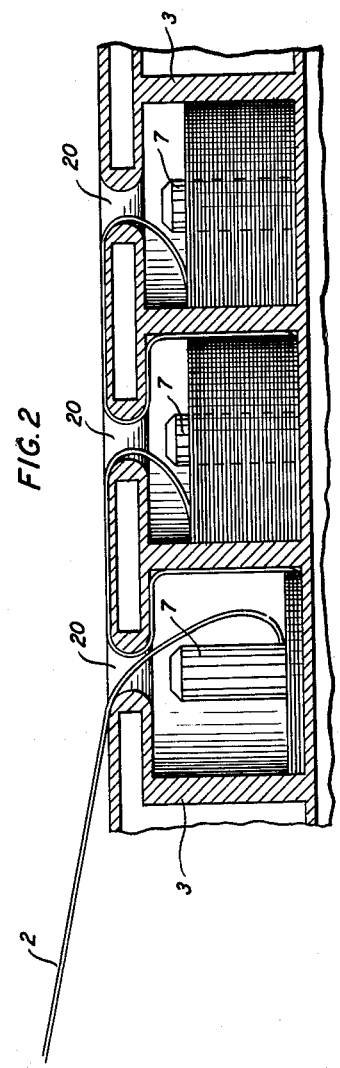
INVENTOR
W. M. BISHOP
BY Stoddard
ATTORNEY

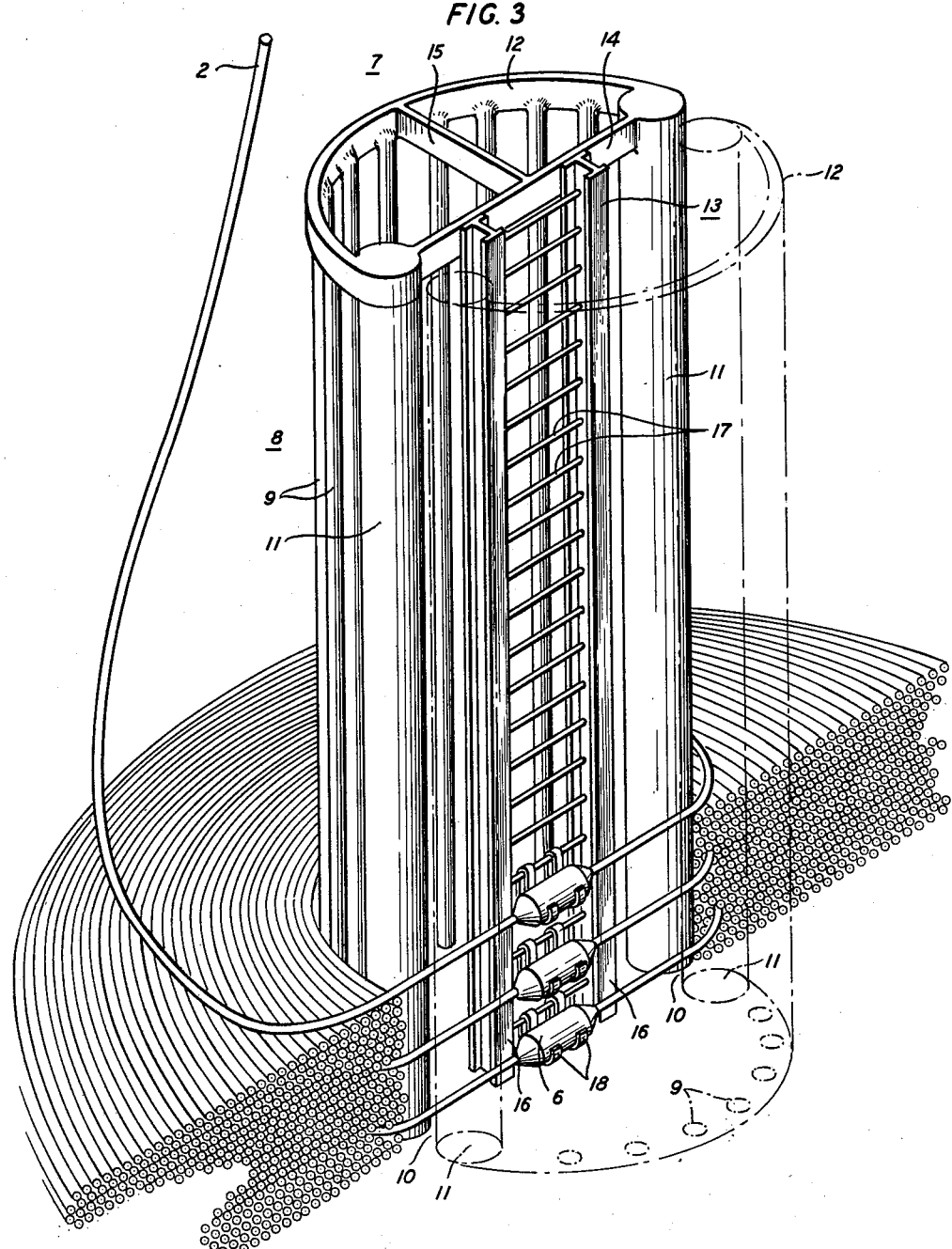

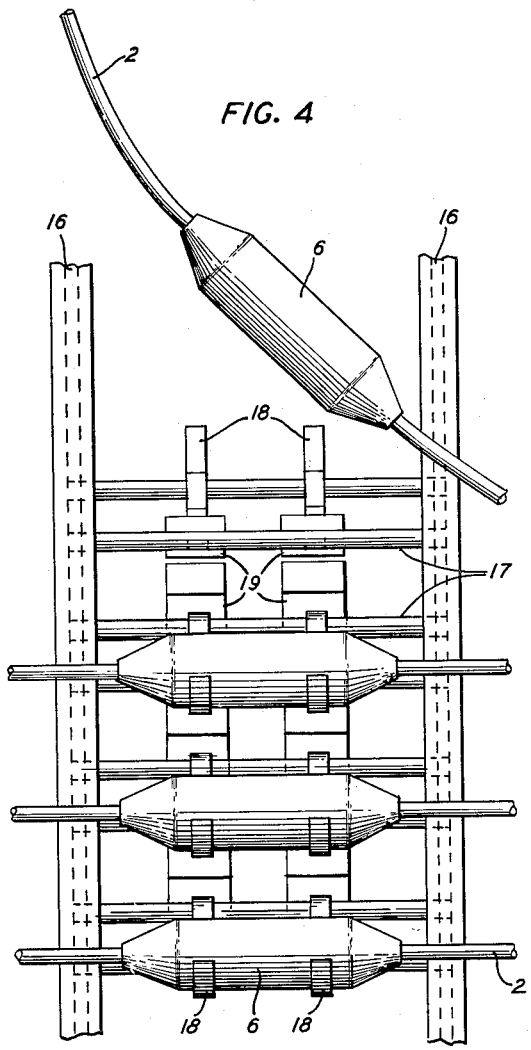
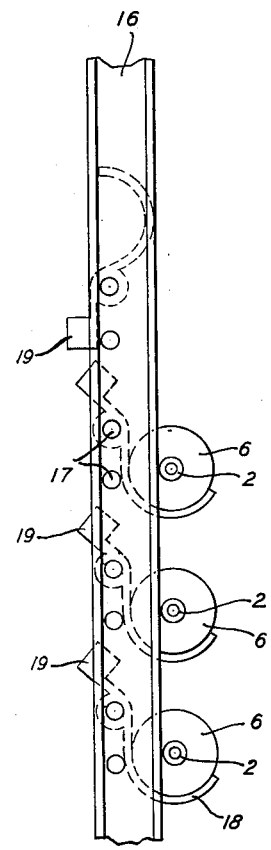

June 11, 1963 W. M. BISHOP 3,093,333
STOWAGE APPARATUS FOR CABLE INSTRUMENTALITY HOUSINGS
Filed July 1, 1960 6 Sheets-Sheet 4

INVENTOR
W. M. BISHOP
BY Stoddard
ATTORNEY

June 11, 1963  W. M. BISHOP  3,093,333
STOWAGE APPARATUS FOR CABLE INSTRUMENTALITY HOUSINGS
Filed July 1, 1960  6 Sheets-Sheet 5

INVENTOR
W. M. BISHOP
BY Stoddard
ATTORNEY

June 11, 1963　　　W. M. BISHOP　　　3,093,333
STOWAGE APPARATUS FOR CABLE INSTRUMENTALITY HOUSINGS
Filed July 1, 1960　　　　　　　　　　6 Sheets-Sheet 6

INVENTOR
W. M. BISHOP
BY B. B. Stoddard
ATTORNEY

United States Patent Office 3,093,333
Patented June 11, 1963

3,093,333
STOWAGE APPARATUS FOR CABLE INSTRU-
MENTALITY HOUSINGS
Walter M. Bishop, Mountainside, N.J., assignor to Bell
Telephone Laboratories, Incorporated, New York,
N.Y., a corporation of New York
Filed July 1, 1960, Ser. No. 40,272
7 Claims. (Cl. 242—54)

This invention relates to cable equipment and, more particularly, to improved shipboard stowage apparatus for holding instrumentality housings individually connected integrally at spaced intervals in an ocean communication cable.

In laying a long undersea cable, such as a transatlantic telephone cable extending for a distance of about 3,000 miles, the usual procedure is to manufacture the cable in long sections each having a length of approximately 200 miles. These long cable sections, known as "ocean blocks," are stowed in the hold of a cable-laying ship which carries them to the points where they are to be laid. At these points, an end of an ocean block of cable which is being carried by the ship is joined to the buoyed end of a cable section which has been previously laid on the bottom of the ocean. After this has been done, the ship proceeds on its course with the cable moving from the hold onto the deck where it is payed out into the ocean by suitable equipment.

In order to securely stow the ocean blocks of cable on board a ship, it is customary to construct several large cylindrical tanks in the ship's hold for receiving the cable. Each tank is of such size as to hold a large quantity of cable, such as one ocean block of cable, coiled in layers therein and may, for example, be forty feet in diameter and twenty-five feet in height. To prevent kinks from being formed in the cable when it is moving out of the tanks, each tank is provided with a central core structure, commonly referred to as a "cone." The configuration of this core structure may be either conical or cylindrical and, depending upon the characteristics of a particular cable, it may have a base diameter of six to ten feet.

The process of coiling ocean cable within a tank is complicated by the fact that a long ocean telephone cable is usually provided with integral lumps at spaced intervals. The spacing between these lumps varies with the type of cable used and may be fifty miles in some cases and ten miles in other instances. The lumps are constituted by housing structures which may be of either flexible or rigid construction and which contain electric equipment, such as repeaters or equalizers. These lump-type housing structures are usually several feet in length and their diameter is considerably greater than the diameter of the cable. Each instrumentality housing ordinarily weighs several hundred pounds.

Due to the size and weight of these instrumentality housings, they have usually not been stowed in the cable tanks, but, instead, have been kept in racks located on the deck of the ship. Since these housings are integral with the cable, each end of each housing is connected to a portion of the cable thereby requiring that a multiplicity of loops of cable be brought from the tank to the relatively large number of housings associated with each ocean block of cable. In other words, when the cable is initially coiled in a stowage tank, a portion of the cable is brought up on deck to the first repeater and a corresponding portion is brought back to the tank where it is coiled until the next repeater is reached whereupon the process of looping the cable is repeated. This continues throughout the operation of coiling or stowing the entire ocean block of cable. This procedure is objectionable because it consumes a considerable amount of time. Another disadvantage is that the instrumentality housing structures and their associated cable loops occupy a large amount of deck space. Furthermore, considerable care must be taken to insure that the large number of cable loops do not become tangled or kinked.

Accordingly, an object of this invention is to provide improved stowage apparatus for holding instrumentality housings connected integrally at spaced intervals in an ocean communication cable.

Another object of the invention is to provide an improved central core structure for a cable stowage tank.

An additional object of the invention is to provide the central core structure of a cable stowage tank with improved means for holding lump-type housing structures that are integral with a cable.

Still another object of the invention is to provide improved stowing and launching means for facilitating the continuous handling of a cable having integral lump-type instrumentality housings.

These and other objects of the invention are attained by providing a cable stowage tank with a central core structure having two diametrically opposed vertical slots formed in its periphery. The top portions of these slots are joined by a horizontal slot extending transversely through the core structure. At the points where each of the vertical slots meets the horizontal slot, gates are pivotally mounted for providing temporary closures thereto. The interior of the core structure contains an upright framework having instrumentalities for supporting the equipment housings in tiers. These supporting instrumentalities are disposed vertically one above the other and are pivotally attached to the framework in such a manner that each has one position for supporting an equipment housing and an alternative position incapable of supporting a housing member. Thus, the equipment housings can be stored on these supporting instrumentalities with their respectively associated cable leads extending through the vertical slots to the coiled cable layers. During the handling of the cable, the supporting instrumentalities also function as launching guides for the equipment housings which are lifted out of the core structure by their cable leads.

These and other features of the invention are more fully discussed in connection with the following detailed description of the drawing in which:

FIG. 1 is a pictorial representation of a cable-handling ship equipped with several cable stowage tanks;

FIG. 2 is a sectional view of the cable stowage tanks;

FIG. 3 is a three-dimensional cross-sectional view of the interior of one of the stowage tanks showing a cable coiled around an improved central core structure built in accordance with this invention;

FIG. 4 is a front view of some of the equipment housings mounted upon the central supporting instrumentalities in accordance with this invention;

FIG. 5 is an end view of the apparatus shown in FIG. 4;

Figure 6:
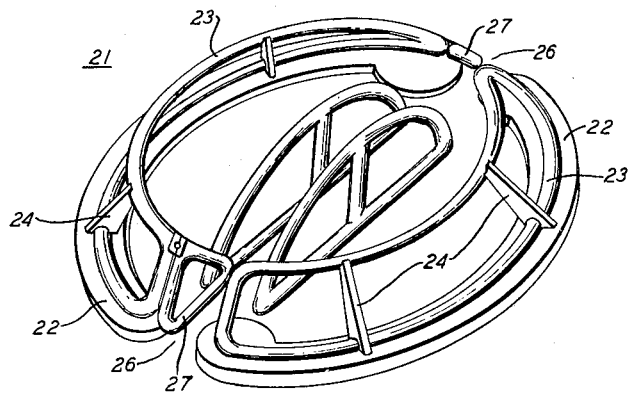
FIG. 6 is a perspective view of an improved frusto-conical top structure adapted to be mounted on top of the central core structure shown in FIG. 3.

In FIG. 1, a cable-handling ship 1 is represented as carrying several ocean blocks of undersea communication cable 2 coiled in stowage tanks 3 located in the ship's hold. The cable 2 travels from the tanks 3 to a cable-handling engine 4 mounted on the deck of the ship 1. After passing through the engine 4, the cable 2 slides down an overboarding chute 5 and passes into the ocean. The cable-handling engine 4 may be of any suitable type known to those skilled in the art and is designed to control the rate of movement of the cable 2 during its passage from the stowage tanks 3 into the ocean. The cable 2 is provided at spaced intervals with integral lump-type housing structures 6. As was stated above, these housing structures 6 contain electric equipment, such as repeaters and equalizers. Hereinafter in the following description, the housing structures 6 will, for the purpose of convenience, be referred to simply as repeaters.

FIG. 2 illustrates the manner in which the cable 2 is stowed in layers in the tanks 3 and is coiled around a central core structure 7 in each of the tanks 3. In order to facilitate continuous paying out of the cable 2 during cable-laying operations, the ends of the cable 2 in the middle tank 3 are brought out and are spliced to corresponding cable ends in the two adjacent tanks 3. Thus, the various ocean blocks of cable 2 are, in effect, joined in one continuous length of cable so that all the cable 2 carried by the ship can be laid in one continuous operation.

Continuous laying of the cable 2 is made easier by the manner in which its repeaters 6 are stowed within the improved tank core structures 7 of this invention as will now be described with reference to the exemplary embodiment shown in the drawing. As is illustrated in FIG. 3, the core 7 comprises a main cylindrical skeleton structure or framework 8 fixedly mounted on the center portion of the base of one of the tanks 3 and extending perpendicularly upward therefrom. The advantage of using a skeleton framework 8 instead of one having solid walls is that it provides ready access to the interior of the core 7 which, in addition to holding the repeaters 6, can be used for stowage of dunnage or as a shelter for personnel.

This main skeleton structure 8 comprises a series of vertical posts 9 arranged in a circle having a radius equal to the minimum bending radius of the cable 2. Two diametrically opposed vertical slots 10, each extending from the bottom level of the posts 9 to the top level thereof, are defined by four columns 11 of considerably larger diameter than the posts 9. Thus, the slots 10, in effect, divide the main skeleton structure 8 into two semi-cylindrical halves. Each of these halves is provided with a semicircular rim member 12 to which the tops of the posts 9 and the columns 11 are securely fastened.

An upright framework 13 is mounted in the center of the skeleton structure 8 and has its top portion securely fastened to a horizontal supporting member 14 attached to the tops of two of the columns 11. A similar horizontal supporting member is attached to the tops of the other pair of columns 11 but is not shown in the drawing in order to provide clarity in FIG. 3. Each of these horizontal supporting members 14 is re-enforced by a respectively associated horizontal brace 15 having one end attached to one of the rim members 12. This upright framework 13 comprises two vertical I beams 16 connected by a series of horizontally disposed rods 17 which resemble the rungs of a ladder. The beams 16 are so placed as to abut against an imaginary straight line drawn through the slots 10, and they are spaced apart by a distance substantially equal to the length of a repeater 6.

Since the repeaters 6 are to be stowed within the core structure 7, a number of holding instrumentalities 18 are provided for supporting the repeaters 6 in tiers within the main skeleton structure 8. These instrumentalities 18 are pivotally mounted on the rods 17 on the upright framework 13 and are disposed vertically one above the other. Due to the fact that the instrumentalities 18 are pivotally mounted, they can be swung downward as is shown in FIGS. 3 and 4. When they are in this position, they form supports for holding the repeaters 6. They are maintained in this position by the weight of the repeaters 6.

During the process of paying out the cable 2, the top repeater 6 will be lifted off its associated holding instrumentalities 18, which also serve as launching supports, and will be pulled out of the core structure 7 as is indicated in FIG. 4. In order to clear the path for the next uppermost repeater 6 to be payed out in its turn, the instrumentalities 18 are so designed as to move out of the way after their respectively associated repeater 6 has been removed. To assist in this function, the ends of the instrumentalities 18 are provided with counterweights 19 which cause them to pivot around the rods 17 when the repeaters 6 are being withdrawn. This causes them to move to the position represented by the uppermost instrumentalities 18 in FIGS. 4 and 5. When in this position, the instrumentalities 18 are incapable of supporting a repeater 6 and are also out of the way of the paying-out path of travel of the repeaters 6. This paying-out or launching path is defined by the I beams 16 and their associated rods 17.

The process of stowing a cable 2 and its repeaters 6 in a tank 3 provided with the improved central core structure 7 of this invention will now be described. An end of the cable 2 is brought into the tank 3 and is laid on the bottom of the tank 3 against its vertical wall. From this starting point, the cable 2 is coiled clockwise, turn against turn, until it meets the core structure 7 thus forming a so-called "flake" of the cable 2 covering the bottom of the tank 3. This procedure is repeated to form successive flakes or layers of the cable 2 until the first repeater 6 is reached. When this occurs, the repeater 6 is brought through one of the slots 10 into the interior of the main skeleton structure 8. The lowermost holding instrumentalities 18 are then pulled down and the repeater 6 is placed thereon. The continuing portion of the cable 2 is drawn out through the opposite slot 10 and the coiling operation is resumed until the next repeater 6 is reached. This second repeater 6 is stowed in a similar manner on the next lowermost holding instrumentalities 18. This procedure is repeated until the tank 3 has been filled.

When the cable 2 is being laid, it is drawn off the top flake or layer in the tank 3 in a counterclockwise direction and is payed out coil by coil until the uppermost repeater 6 is reached. At this point, the outboard portion of the cable 2 is drawn up through one of the slots 10. This causes the adjacent end of the repeater 6 to tilt upward, as is shown in FIG. 4, with the result that the repeater 6 is pulled up and off its supporting instrumentalities 18 which, consequently, move away from their holding position. The repeater 6 continues to move upward carrying with it the inboard portion of the cable 2. It is to be noted that this upward movement of the inboard, or trailing, portion of the cable 2 is permitted, or made possible, by the presence of the opposite slot 10. When this portion of the cable 2 reaches the top of the main skeleton structure 8, it moves out of the slot 10 and the succeeding portion of the cable 2 is pulled out of its coils in the tank 3 in the ordinary way until the next repeater 6 is reached. This repeater 6 will be launched from its holding instrumentalities 18 in the same manner as that described above and will be drawn out of the interior of the main skeleton structure 8 without any interruption of the continuous paying-out process. This procedure is repeated until the tank 3 has been emptied.

Figure 7:
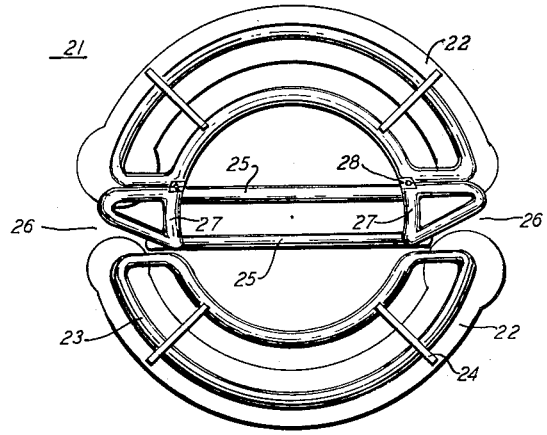
FIG. 7 is a plan view of the improved top structure shown in FIG. 6.

During the paying-out process, the cable 2 is drawn out of an opening 20 in the top of each tank 3, as is indicated in FIG. 2. In order to guide the cable 2 into the opening 20, the central core structure 7 is provided with a top skeleton structure 21 that is shown in FIGS. 6 and 7. As can be best seen in FIG. 6, this top structure 21 is formed somewhat in the shape of a truncated cone. It comprises two semicircular base plates 22 each having a configuration similar to the corresponding semicircular rim members 12 of the main cylindrical structure 8. These base plates 22 are adapted to be securely fastened to the rim members 12 by any suitable means, such as bolts. Attached to each base plate 22 is a tubular framework 23 which has its top portion supported by brackets 24.

The top structure 21 also includes two transversely disposed framework members 25 which are adapted to be vertically mounted on the top surfaces of the horizontal supporting members 14 of the main cylindrical structure 8. The tops of these transverse members 25 are curved in order to facilitate the sliding motion of the cable 2. The members 25 are so arranged and constructed as to define a transverse horizontal slot 26 extending diametrically through the top structure 21 and opening into the vertical slots 10 in the main cylindrical structure 8. It is to be noted that, in this embodiment of the invention, the horizontal slot 26 and the vertical slots 10 each have a width at least equal to the thickness of a repeater 6. Therefore, the repeaters 6 can be fed in through the vertical slots 10 and can be pulled out of the horizontal slot 26.

While the cable 2 is being payed out of the tanks 3, there may be occasions when the upwardly extending length of the cable 2 will slide around the edges of the rim members 12. When this occurs, the cable 2 might become fouled or caught in the top portions of the vertical slots 10 and also in the horizontal slot 26. In order to prevent this from occurring, the junctions between the ends of the horizontal slot 26 and the tops of the vertical slots 10 are guarded by gates 27 which are pivotally mounted on the tubular framework 23 for providing movable closures thereto. The pivotal mounting 28 for the gates 27 is so designed as to enable the gates 27 to swing upward. Suitable biasing means, such as built-in springs, are provided for returning the gates 27 to their closed positions after they have been opened.

Thus, during the time that the cable 2 is being drawn from its coils in one of the tanks 3, it slides around the central core structure 7 with the gates 27 functioning to prevent the cable 2 from entering the horizontal slot 26 and the top portions of the vertical slots 10. However, when one of the repeaters 6 is to be payed out, the outboard portion of the cable 2 is pulled up through one of the vertical slots 10 until it meets the respectively associated gate 27. At this time, the cable 2 will force the gate 27 upward. The upward movement of the gate 27 permits the outgoing portion of the cable 2 to move into the horizontal slot 26. After this has occurred, the gate 27 returns to its closed position. While the cable 2 is moving up through the horizontal slot 26, it pulls the top repeater 6 up and out of the central core structure 7. The inboard portion of the cable 2 follows the repeater 6 upward through the horizontal slot 26 with its trailing portion moving up through the other vertical slot 10. When this trailing portion of the cable 2 reaches the top of this other vertical slot 10, it forces the other gate 27 upward and moves out of both the horizontal slot 26 and the vertical slot 10. This permits the second gate 27 to swing back to its normally closed position. The cable 2 then returns to its former paying out condition wherein it is drawn off its coiled turns in the normal manner.

Figure 8:
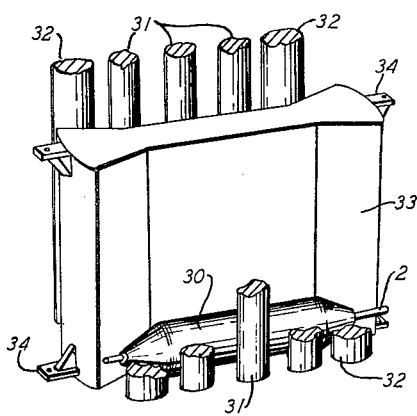
FIG. 8 is a three-dimensional view of an alternative construction for the interior of the central core structure.
Figure 9:
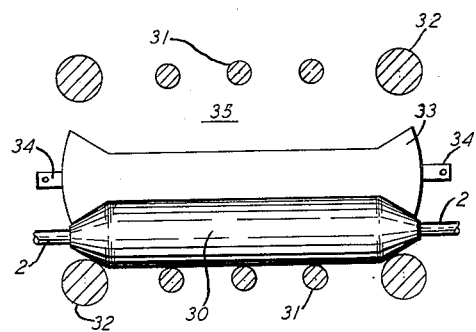
FIG. 9 is a plan view of the apparatus shown in FIG. 8.

In another embodiment of the invention, repeaters 30, which have somewhat different proportions than the repeaters 6, are stowed in tiers in two vertical series or pile-ups within the main cylindrical structure 8. This is accomplished by substituting other instrumentalities in place of the I beams 16 and their associated horizontal rods 17. As is shown in FIGS. 8 and 9, these other instrumentalities comprise a number of posts 31 and columns 32 vertically mounted in two rows on the central part of the base of a cable stowage tank 3. The posts 31 are arranged along the middle portions of the two rows so as to abut against the sides of the repeaters 30. The columns 32 are placed at both ends of each of the rows and, since their diameters are wider than those of the posts 31, they abut against the tapered nose and tail portions of the repeaters 30 as is best shown in FIG. 9.

The two stacks or columns of repeaters 30 are separated by a spacing structure 33 which has sufficient thickness to abut against the sides of the repeaters 30 in each stack. This spacing structure 33 is constructed in such a manner as to have flared ends which abut against the tapered nose and tail portions of the repeaters 30 in a manner best seen in FIG. 9. In order to facilitate the handling of the repeaters 30 during the process of stowing them, the spacing structure 33 is fabricated in sections which are designed to be mounted one on top of the other. For the purpose of holding these spacing sections 33 securely in place, their flared ends are provided with brackets 34 which can be bolted together. The lower brackets 34 on the bottom spacing section 33 are bolted to the base of the associated stowage tank 3. Thus, the spacing structure 33 serves as a divider for the two stacks of repeaters 30 and also functions as one side of each of two vertical cages 35 which have their other sides constituted by the two rows of posts 31 and columns 32.

From the above description, it can be understood that each of the repeater stowage cages 35 has an interior cross-sectional area substantially equal to the shape of the profile of a repeater 30. This serves to hold the repeaters 30 securely in place and prevents them from unnecessarily shifting their positions. During launching operations, the cage structures 35 minimize swinging of the repeaters 30 and function to guide them upward in a smooth manner. In effect, the posts 31 serve as rails for providing or defining a launching path over which the repeaters 30 can slide during the launching process.

Figure 11:
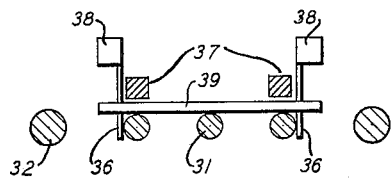
FIG. 11 is a plan view of the supporting apparatus shown in FIG. 10.
Figure 10:
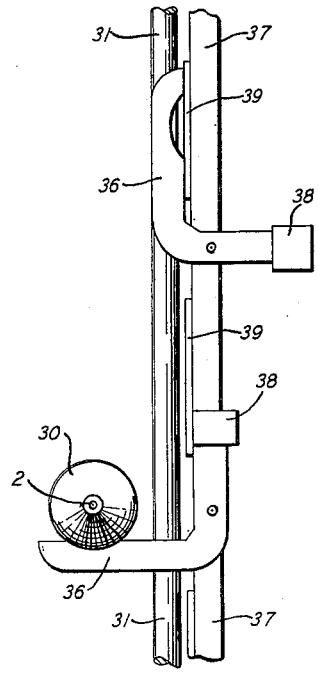
FIG. 10 is a side view of an alternative form of apparatus for supporting the equipment housings in their stowed positions.

This embodiment of the invention also includes means shown in FIGS. 10 and 11 for supporting or holding each repeater 30 within its respectively associated cage structure 35. These means include a series of pairs of arms 36 located at appropriately spaced vertical intervals in each cage structure 35. These arms 36 are pivotally fastened to a pair of supporting members 37 which are vertically mounted adjacent to the posts 31. Each pair of arms 36 is provided with counterweights 38 which cause the arms 36 to swing upward when their associated repeater 30 is removed. It should be noted that when these arms 36 swing upward, they abut against a backing plate 39 which is fastened to the pair of supporting members 37. When the arms 36 are in this position, they form supplementary vertical rails which function as additional means for defining a launching path for guiding the upward movement of the repeaters 30 when they are payed out.

When this embodiment of the invention is used, the main cylindrical framework 8 may be modified, if desired, by rearranging the large vertical columns 11 in such a manner as to reduce the width of the vertical slots 10 to substantially the thickness of the cable 2. Accordingly, when the cable 2 is now stowed, the repeaters 30 will be lowered from the top of the central core structure 7 in such a manner that the repeaters 30 pass down through one of the above-mentioned cage structures 35 with the associated leading and trailing portions of the cable 2 sliding down through these narrowed vertical slots 10. Just before a repeater 30 reaches the appropriate stowage position within its cage structure 35, the pair of arms 36 located at this point are manually swung down and the repeater 30 is placed thereon. When the arms 36 are in this position, their counterweights 38 abut against their respectively associated backing plate 39. As the height of the stowed repeater pile-up increases, additional sections of the spacing structure 33 are added. This process continues until the associated stowage tank 3 has been filled.

Figure 12:
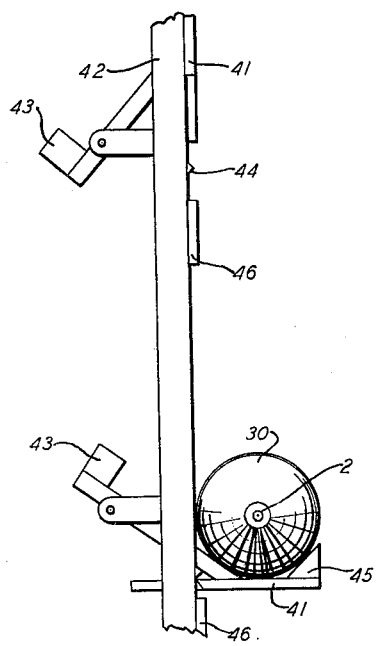
FIG. 12 is a side view of another alternative form of apparatus for holding the stowed instrumentality housing structures.
Figure 13:
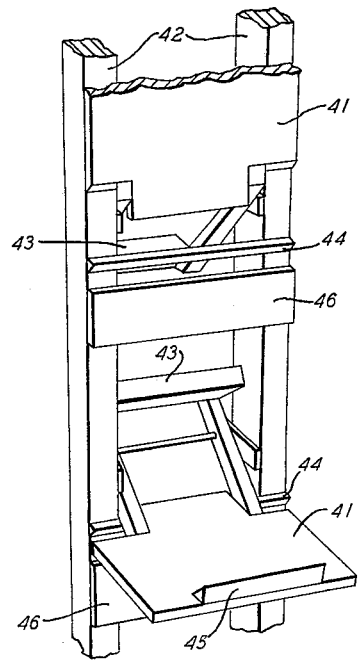
FIG. 13 is a perspective view of the holding apparatus that is shown in FIG. 12.

Another form of means for holding or supporting the repeaters 30 in tiers comprises a plurality of self-retracting shelves 41 which are shown in FIGS. 12 and 13. These shelves 41 are pivotally attached to vertically mounted supporting members 42 and are provided with counterweights 43. When a repeater 30 is to be stowed, the appropriately located shelf 41 is pulled down against a supporting bar 44 and the repeater 30 is placed thereon. As can be seen in the drawing, the front portions of the shelves 41 are provided with cleats or wedges 45 to assist in holding the repeaters 30.

During cable paying-out operations, the uppermost repeater 30 is drawn upward in the manner described above. When the repeater 30 moves off its shelf 41, the respectively associated counterweight 43 will move downward. This causes the shelf 41 to move upward against the vertical supporting members 42 thus clearing the launching path for the next repeater 30. It is to be noted that, when a shelf 41 is in this retracted position, the bottom of the shelf 41 defines a launching path as it provides a smooth surface for guiding the upward movement of the next uppermost repeater 30. This guiding function is further assisted by supplementary guide members 46 which are attached to the vertical supports 42. Each of these guide members 46 is made sufficiently wide for the purpose of filling the space between the bottom edge of one of the supporting bars 44 and the retracted position of the top edge of the next lower shelf 41. This construction provides the repeaters 30 with a substantially continuous launching chute.

Figure 14:
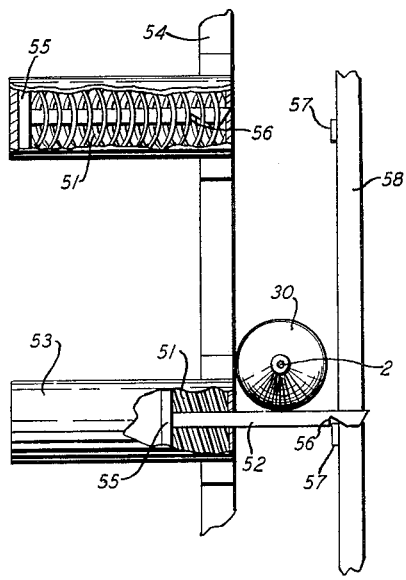
FIG. 14 is a side view of an additional form of apparatus for supporting the instrumentality housing structures in their stowed positions.
Figure 15:
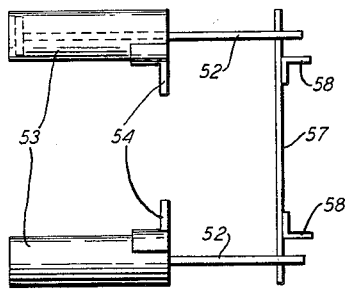
FIG. 15 is a plan view of the supporting apparatus shown in FIG. 14.

Instead of using counterweights for retracting the repeater holding instrumentalities, other means, such as biasing springs 51, may be used as is shown in FIGS. 14 and 15. In this form of the invention, the holding instrumentalities 52 are so disposed as to slide in and out of cylinders 53 which are mounted on a pair of vertical supports 54. Each of these cylinders 53 contains a spring 51 coiled around a holding instrumentality 52 and having one end abutting against an end of the cylinder 53. The other end of each spring 51 abuts against an enlarged head 55 at one end of its associated holding instrumentality 52. The other end of each holding instrumentality 52 is provided with a cam-shaped notch 56 which is so designed as to engage an associated one of a series of horizontal bars 57 attached to another pair of vertical supports 58. If desired, the cylinders 53 can be made sufficiently strong to serve as steps for personnel to climb up and down the vertical supports 54.

When a repeater 30 is to be stowed in this form of the invention, the appropriately located pair of holding instrumentalities 52 are moved to their extended positions by using suitable means to push against their heads 55 until their notches 56 engage the respectively associated horizontal bar 57. During this procedure, the associated coiled springs 51 become compressed. The repeater 30 is then placed on top of this pair of holding instrumentalities 52. When the repeater 30 is in this position, its weight prevents the compressed springs 51 from pulling the notches 56 out of their engagement with the bar 57. However, when the repeater 30 is pulled upward during paying-out operations, the removal of its weight permits the compressed springs 51 to release the notches 56 from their engagement with the bar 57. This enables the springs 51 to move back to their unstressed positions thereby forcing or pulling the holding instrumentalities 52 back inside the cylinders 53. This serves to clear the path for the next repeater 30 to be payed out.

What is claimed is:

1. Stowage apparatus for holding cable housing structures in a tiered stack formation preparatory to their sequential launching during subsequent cable paying-out operations, said apparatus comprising instrumentalities so constructed and arranged as to define a launching path for said housings during cable paying-out operations, a plurality of self-retracting holding means each adapted to hold at least part of a housing, means for mounting each of said holding means for movement into two alternative positions, one of said positions being in said launching path and the other position being out of said launching path, and biasing means for moving each of said holding means to said position out of said launching path.

2. Stowage apparatus for stowing instrumentality housings serially connected at intervals in a cable, said apparatus comprising a cage structure for enclosing said housings, and a plurality of holding means for holding each of said housings separately within said cage structure in a tiered stack formation, each of said holding means having two alternative positions, each of said holding means being adapted when in one of said positions to hold one of said housings, and each of said holding means being adapted when in the other of said positions to define a launching path for the movement of said housings out of said cage structure during cable paying-out operations.

3. Stowage apparatus for stowing instrumentality housings serially connected at intervals in a cable, each of said housings having a nose portion connected to a leading portion of said cable and a tail portion connected to a trailing portion of said cable, said apparatus comprising a structure for confining said housings in a tiered stack formation, said structure having means defining an egress therefrom for said leading cable portions, said structure also having means defining an egress therefrom for said trailing cable portions, said structure further including means defining an egress therefrom for said housings, said last-mentioned means being disposed at the top of said structure and being adapted to define a transverse slot extending across the top of said structure, said slot having a width at least equal to the width of one of said housings, and two movable gating means each pivotally mounted near opposite ends of said slot for alternatively blocking and unblocking the ends of said slot.

4. Stowage apparatus for holding cable housings in a tiered stack formation preliminary to their launching seriatim during subsequent cable paying-out operations, said apparatus comprising instrumentalities so constructed and arranged as to define a launching path for said housings during cable paying-out operations, said instrumentalities including guide means for guiding said housings along said launching path, a plurality of holding means each adapted to hold at least part of a housing, means for mounting each of said holding means for movement into two alternative positions, one of said positions being in said launching path for enabling the holding means to hold said housings, the other of said positions being out of said launching path for enabling the holding means to serve as supplementary guide means for guiding said housings along said launching path, and biasing means tending to move each of said holding means to said position out of said launching path.

5. Stowage apparatus for stowing instrumentality housings serially connected at intervals in a cable, each of said housings having a tapered nose portion connected to a leading portion of said cable and a tapered tail portion connected to a trailing portion of said cable, said apparatus comprising a cage structure for confining said housings in two adjacent vertical stack formations, said cage structure having two outer sides each disposed to conform with the profile of one side of a housing, and said cage structure including intermediate spacing means having flared ends to conform with the side profiles of two of said housings.

6. Apparatus for stowing housings serially connected in a cable, said apparatus comprising a plurality of instrumentalities disposed in tiers for holding a stack formation of said housings, a core structure enclosing said instrumentalities, means defining two oppositely disposed vertical slots in said structure for admitting therein portions of said cable to which said housings are connected, means defining a transverse slot in said structure for providing an egress therefrom for said housings, said transverse slot being horizontally disposed with its ends joining the upper ends of said vertical slots, and means at the junctions of said horizontal slot with said vertical slots for forming movable closures thereto for blocking the entrance therein of other portions of said cable.

7. Apparatus for stowing repeaters individually connected at intervals to a cable coiled within a tank and supported by the base thereof, said apparatus comprising a hollow core having a main skeleton structure extending perpendicularly upward from said base, means defining two diametrically opposed vertical slots in said structure each extending from the bottom to the top thereof, a top skeleton structure formed in the shape of a truncated cone and having its bottom joined to the top of said main structure, means defining a transverse slot extending diametrically through said top structure and opening into said vertical slots, at least one of said slots having a width at least equal to the thickness of a repeater, a gate pivotally mounted at the junction between one end of said transverse slot and the top of one of said vertical slots, said pivoted gate having one position for closing a portion of said transverse slot and having an alternative position for moving away from said transverse slot, an upright framework supported entirely within said main skeleton structure, and a plurality of instrumentalities attached to said framework and disposed vertically one above the other, said instrumentalities being constructed and arranged for supporting repeaters in tiers within said main skeleton structure, each of said instrumentalities having one position for supporting a repeater and an alternative position incapable of supporting a repeater.

References Cited in the file of this patent

UNITED STATES PATENTS

| | | |
|---|---|---|
| 1,966,532 | Williams | July 17, 1934 |
| 2,285,632 | Urbain | June 9, 1942 |
| 2,507,040 | Moore | May 9, 1950 |
| 2,973,919 | Goldrick et al. | Mar. 7, 1961 |
| 2,990,134 | Bates et al. | June 27, 1961 |

FOREIGN PATENTS

| | | |
|---|---|---|
| 810,984 | France | Jan. 9, 1937 |